United States Patent
Bender et al.

(10) Patent No.: US 11,165,779 B2
(45) Date of Patent: Nov. 2, 2021

(54) GENERATING A CUSTOM BLACKLIST FOR A LISTENING DEVICE BASED ON USAGE

(71) Applicant: International Business Machines Corporation, Armonk, NY (US)

(72) Inventors: Michael Bender, Rye Brook, NY (US); Jeremy R. Fox, Georgetown, TX (US); Kulvir Singh Bhogal, Fort Worth, TX (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 16/203,733

(22) Filed: Nov. 29, 2018

(65) Prior Publication Data

US 2020/0177593 A1  Jun. 4, 2020

(51) Int. Cl.
*H04L 29/06* (2006.01)
*H04W 12/12* (2021.01)

(52) U.S. Cl.
CPC .......... *H04L 63/101* (2013.01); *H04L 63/107* (2013.01); *H04L 63/12* (2013.01); *H04L 63/123* (2013.01); *H04L 63/126* (2013.01); *H04W 12/12* (2013.01)

(58) Field of Classification Search
CPC ... H04L 63/101; H04L 63/107; H04L 63/123; H04L 63/126; H04L 63/12; H04W 12/12
See application file for complete search history.

(56) References Cited

U.S. PATENT DOCUMENTS

| | | | |
|---|---|---|---|
| 5,899,972 A | 5/1999 | Miyazawa | |
| 7,139,706 B2* | 11/2006 | Yuschik | G10L 15/065 704/243 |
| 7,882,032 B1 | 2/2011 | Hoffman | |

(Continued)

FOREIGN PATENT DOCUMENTS

| | | |
|---|---|---|
| WO | 2018085192 A1 | 5/2018 |
| WO | 20180851921 | 5/2018 |

OTHER PUBLICATIONS

Liao, Song, et al. "Measuring the effectiveness of privacy policies for voice assistant applications." Annual Computer Security Applications Conference. 2020, pp. 856-869. (Year: 2020).*

(Continued)

*Primary Examiner* — Kari L Schmidt
(74) *Attorney, Agent, or Firm* — Marcus Walker

(57) ABSTRACT

Aspects of the present invention disclose a method, computer program product, and system for modifying a prohibited list. The method includes one or more processors determining a trend in usage of a command based on an analysis of aggregated usage information of the command from a plurality of listening devices, wherein the determined trend indicates an amount of usage of the command over a period of time. The method further includes determining whether the determined trend in usage of the command deviates from a usage threshold for the command. The method further includes in response to determining that the determined trend in usage of the command does deviate from the usage threshold for the command, modifying a (Continued)

prohibited list based on an amount of deviation from the usage threshold usage of the command.

17 Claims, 4 Drawing Sheets

(56) References Cited

U.S. PATENT DOCUMENTS

| | | | | |
|---|---|---|---|---|
| 8,223,954 | B2* | 7/2012 | Dallessandro | H04M 3/51 379/265.02 |
| 9,368,105 | B1 | 6/2016 | Freed | |
| 9,548,053 | B1 | 1/2017 | Basye | |
| 9,697,828 | B1 | 7/2017 | Prasad | |
| 9,728,188 | B1 | 8/2017 | Rosen | |
| 9,940,949 | B1 | 4/2018 | Vitaladevuni | |
| 9,990,921 | B2 | 6/2018 | Vanblon | |
| 10,074,364 | B1* | 9/2018 | Wightman | G10L 17/04 |
| 10,706,848 | B1* | 7/2020 | Greene | G06N 20/00 |
| 2002/0198722 | A1* | 12/2002 | Yuschik | G10L 15/1822 704/275 |
| 2003/0216919 | A1 | 11/2003 | Roushar | |
| 2008/0091426 | A1 | 4/2008 | Rempel | |
| 2008/0301135 | A1 | 12/2008 | Alves | |
| 2013/0317827 | A1* | 11/2013 | Fu | G10L 17/00 704/273 |
| 2014/0249817 | A1 | 9/2014 | Hart | |
| 2014/0278435 | A1 | 9/2014 | Ganong, III | |
| 2016/0078860 | A1* | 3/2016 | Paulik | G10L 15/197 704/244 |
| 2018/0158449 | A1 | 6/2018 | Tang | |
| 2018/0218079 | A1* | 8/2018 | Li | G06F 40/289 |
| 2018/0330728 | A1* | 11/2018 | Gruenstein | G10L 17/00 |
| 2019/0080698 | A1* | 3/2019 | Miller | G10L 17/22 |
| 2019/0319951 | A1* | 10/2019 | West, III | H04L 63/126 |
| 2019/0342339 | A1* | 11/2019 | Nanda | H04L 63/102 |

OTHER PUBLICATIONS

Feng, Huan, Kassem Fawaz, and Kang G. Shin. "Continuous authentication for voice assistants." Proceedings of the 23rd Annual International Conference on Mobile Computing and Networking. 2017, pp. 343-355 (Year: 2017).*

Tabassum, Madiha, et al. "Investigating Users' Preferences and Expectations for Always-Listening Voice Assistants." Proceedings of the ACM on Interactive, Mobile, Wearable and Ubiquitous Technologies 3.4 (2019): 1-23. (Year: 2019).*

Fingas, "Alexa will stay calm during Amazon's Super Bowl ad. Amazon is using clever tech tricks to prevent any rude surprises", engadget, Feb. 22, 2018, 9 pps., https://www.engadget.com/2018/02/02/amazon-super-bowl-ad-wont-trigger-echo/.

Komando, "How to listen to everything Amazon Echo has ever heard", Published Apr. 15, 2017, The Kim Komando Show, Tech, Fox News, 8 pps., http://www.foxnews.com/tech/2017/04/15/how-to-listen-to-everything-amazon-echo-has-ever-heard.html.

Lanaria, "This Is Amazon's Solution to Keep Alexa From Waking Up When the TV Says Its Name", Tech Times, Feb. 4, 2018, 5 pps., http://www.techtimes.com/articles/220323/20180204/this-is-amazons-solution-to-keep-alexa-from-waking-up-when-the-tv-says-its-name.htm.

* cited by examiner

GENERATING A CUSTOM BLACKLIST FOR A LISTENING DEVICE BASED ON USAGE

BACKGROUND OF THE INVENTION

The present invention relates generally to the field of mobile devices, and more particularly to blocking commands to listening devices.

In recent years, developments in digital assistants and the growth of Internet of Things (IoT) capable devices have created competition to introduce new voice interfaces (e.g., for smart speakers, virtual assistance hardware/software, etc.). The IoT is a network of physical devices embedded with electronics, software, sensors, and connectivity which enables these devices to connect and exchange data with computer-based systems. Technology is embedded in IoT-enabled devices that allow these devices to communicate, interact, be monitored, and controlled over the Internet.

A command is an instruction given by a user telling a device to perform a specific task. Digital assistants receive commands from a user in either text-based or spoken form. As the popularity of the latter form has grown, so has the demand to implement more meaningful and useful commands. A user can use commands to control the lighting in a home, transfer money, or buy products online. However, a common issue amongst IoT devices is the lack of ability to refrain from performing a task associated with a command embedded in multimedia.

Prohibited listing is the act of adding commands to a list that are unacceptable, avoided, or distrusted by the creator of the list. In certain situations, a command is added to a prohibited list for only a limited amount of time to prevent the permanent banning of commands from use. Prohibited lists prevent a device from performing a specific task associated with a particular command.

SUMMARY

Aspects of the present invention disclose a method, computer program product, and system for generating and/or modifying a prohibited list. The method includes determining, by one or more processors, a trend in usage of a command based on an analysis of aggregated usage information of the command from a plurality of listening devices, wherein the determined trend indicates an amount of usage of the command over a period of time. The method further includes determining, by one or more processors, whether the determined trend in usage of the command deviates from a usage threshold for the command. The method further includes in response to determining that the determined trend in usage of the command does deviate from the usage threshold for the command, modifying, by one or more processors, a prohibited list based on an amount of deviation from the usage threshold usage of the command.

DETAILED DESCRIPTION

Embodiments of the present invention allow for a device to ignore commands based on statistical changes of use of the commands in a geographical area. Embodiments of the invention capture all commands received by a listening device and tag the commands with location and time metadata. The tagged commands are monitored to identify significant increases or decreases in a usage frequency of a command. Embodiments of the invention add, remove, or process a command with respect to changes in a usage rate of a command.

Some embodiments of the present invention recognize that devices do not differentiate a command of a user from commands embedded in media (e.g., a song, commercial, etc.) and utilize a predefined prohibited list, which does not adjust based on usage statistics of identified commands. Consequently, commands embedded in content can create scenarios where a device is performing undesirable actions in response to false commands embedded in content. For example, a device in range of the television, which plays a prerecorded show with commercials that includes a "buy now" command, can receive the command and the device falsely reacts to the command. Some embodiments of the present invention overcome this challenge through utilization of natural language processing (NLP) and cognitive analysis to create a statistical database of command usage and modify a prohibited list file based on statistical changes in command usage. Various embodiments of the present invention prevent a device from reacting falsely to commands based on increases or decreases in usage within a geographical region. Accordingly, embodiments of the present invention improve listening device technology by reducing an amount of false positives.

Embodiments of the present invention recognize that existing solutions for modifying a prohibited list is a continual and fluctuating process. Some embodiments of the present invention overcome this challenge and improve the efficiency of the process by aggregating data of devices, determining trends within a geographic area and/or timeframe, and modifying and/or generating a prohibited list based on deviations in the trends of the aggregated data in near real-time. In addition, various embodiments of the present invention provide improvements of reducing the amount of processing resources and power consumption by preventing a device from processing a false command.

Implementation of embodiments of the invention may take a variety of forms, and exemplary implementation details are discussed subsequently with reference to the Figures.

Figure 1:
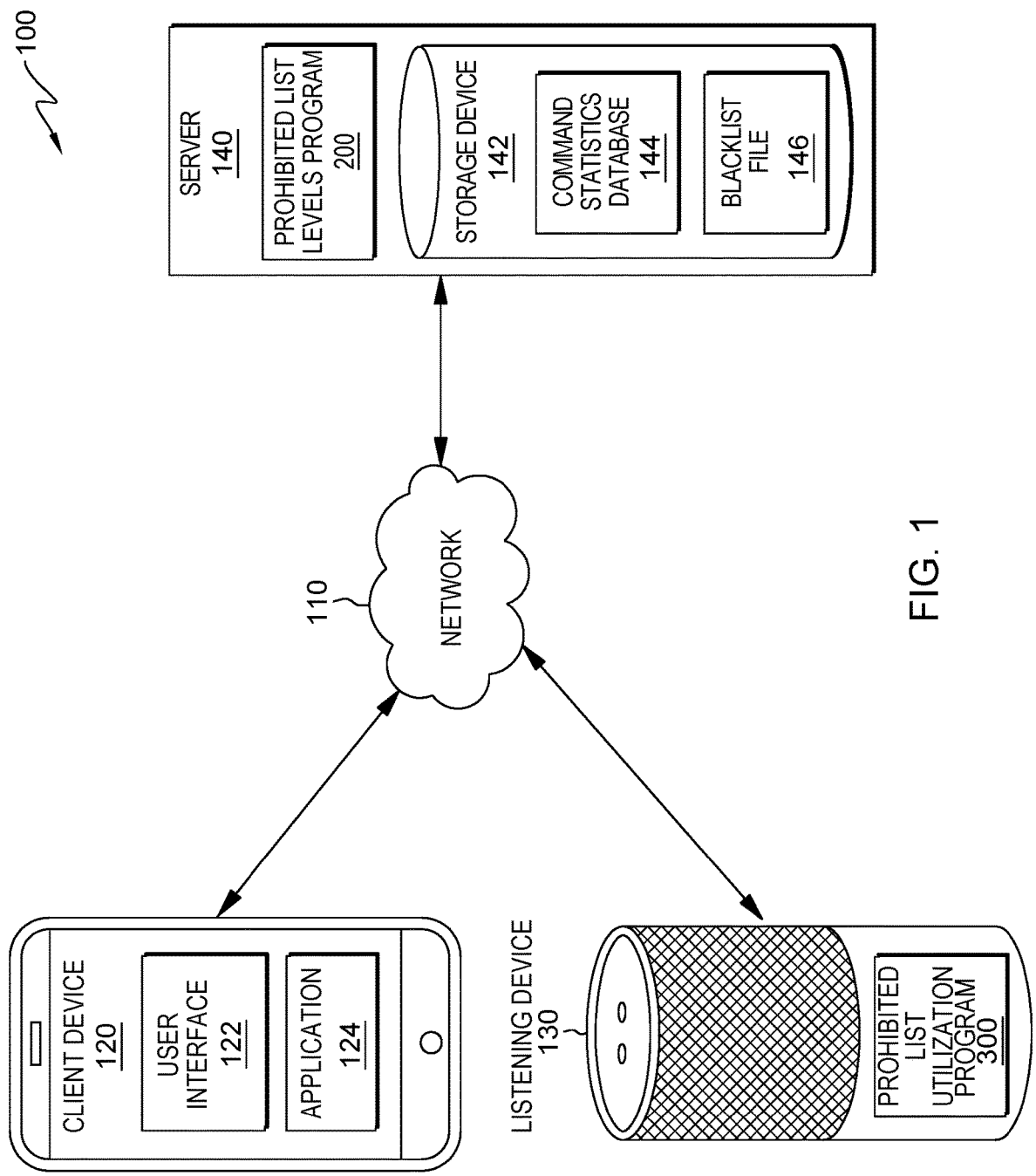
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 120, listening device 130, and server 140, all interconnected over network 110. In one embodiment, client device 120, listening device 130, and server 140 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between client device 120, listening device 130, and server 140, in accordance with embodiments of the present invention. For example, a mobile device (e.g., client device 120), a smart speaker (e.g., listening device 130), and a server (e.g., server 140) transmit and receive data to one another through the Internet.

In various embodiments of the present invention, client device 120 may be a workstation, personal computer, digital video recorder (DVR), media player, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 4, in accordance with embodiments of the present invention.

Client device 120 includes user interface 122 and application 124. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to respond to a request of prohibited list file 146. For example, a user can use a web browser (e.g., application 124) of a tablet (e.g., client device 120) to confirm or deny a request for processing a command. In another example, application 124 is a biometric authentication application used to confirm or deny the processing of a command.

Listening device 130 includes prohibited list utilization program 300. In various embodiments of the present invention, listening device 130 may be a smart speaker, or any other device capable of executing computer readable program instructions, in accordance with embodiments of the present invention. Listening device 130 includes speakers, a processor, a microphone, and/or a global positioning system (GPS). In various embodiments of the present invention, a user utilizes listening device 130 to play audio, receive commands, perform task, and communicate with other IoT-enabled devices and other users. In one embodiment, a user states a command that listening device 130 receives and performs the task associated with the command. For example, a user states a trigger word that a microphone of a smart speaker detects and correlates to a command associated with a specific task. In another embodiment, listening device 130 can allow prohibited list levels program 200 to collect data of listening device 130. For example, a user may opt-in and allow prohibited list levels program 200 to identify and store commands listening device 130 receives. In yet another embodiment, listening device 130 can deny prohibited list levels program 200 from collecting data of listening device 130. For example, a user may opt-out and prevent prohibited list levels program 200 from continuing to identify and store commands listening device 130 receives.

In another embodiment, listening device 130 communicates with client device 120 to perform a task associated with a command of a user. For example, a user states, "Open pizza application and buy my favorite pizza." A smart speaker receives the request, opens the pizza app on a tablet of a user, and places an order for a pizza. In another embodiment, listening device 130 communicates with server 140 to determine whether to process a command. For example, a smart speaker receives a request and accesses a prohibited list file 146 on server 140 to determine whether the request is permissible. In an additional embodiment, prohibited list file 146 is stored locally on listening device 130 (i.e., server 140 has transmitted prohibited list file 146 to listening device 130 via network 110).

Prohibited list utilization program 300 utilizes NLP to detect keywords in the operating environment of listening device 130. For example, prohibited list utilization program 300 uses a microphone of a smart speaker (e.g., listening device 130) and speech to text techniques to derive words of content in an operating environment of the smart speaker. In this example, prohibited list utilization program 300 parses a prohibited list file (e.g., prohibited list file 146) to determine whether the derived words of the operating environment of the smart speaker are included in the prohibited list file. In another embodiment, prohibited list utilization program 300 utilizes prohibited list file 146 to process detected keywords in the operating environment of listening device 130. For example, prohibited list utilization program 300 utilizes prohibited list file 146 to determine a processing level of a detected keyword and generates a request and notification that requires a user to confirm or ignore a command corresponding to a detected keyword. In another example, prohibited list utilization program 300 utilizes prohibited list file 146 to determine a processing level of a detected keyword and prohibits the smart speaker (e.g., listening device 130) from executing the command that corresponds to the detected keyword.

In various embodiments of the present invention, server 140 may be a desktop computer, a computer server, or any other computer systems, known in the art. In certain embodiments, server 140 represents computer systems utilizing clustered computers and components (e.g., database server computers, application server computers, etc.), which act as a single pool of seamless resources when accessed by elements of data processing environment 100 (e.g., client device 120, listening device 130, etc.). In general, server 140 is representative of any electronic device or combination of electronic devices capable of executing computer readable program instructions. Server 140 may include components as depicted and described in further detail with respect to FIG. 4, in accordance with embodiments of the present invention.

Server 140 includes storage device 142, command statistics database 144, prohibited list file 146, and prohibited list levels program 200. Storage device 142 can be implemented with any type of storage device, for example, persistent storage 405, which is capable of storing data that may be accessed and utilized by server 140, client device 120, and listening device 130, such as a database server, a hard disk drive, or a flash memory. Prohibited list file 146 is a list of commands that correspond to keywords, which are prohibited from execution or require confirmation before the execution of the task associated with the command. Prohibited list file 146 can be stored in server 140 and/or listening device 130.

Command statistics database 144 is a database that includes commands of listening device 130 and data that corresponds to a frequency rate of each command within a geographical area. In one embodiment, command statistics database 144 includes a collection of commands listening device 130 receives. For example, all commands received, over the course of a day, by smart speakers within a particular region are stored in command statistics database 144. In another embodiment, command statistics database 144 stores statics of a user interaction with a command that listening device 130 receives. For example, the number of times that users confirm or deny a "buy pizza" command is stored in command statistics database 144.

In another embodiment, command statistics database 144 stores a collection of data that includes the frequency of use for each command. For example, the number of times a command to order a pizza is received by smart speakers of a particular region within a day (i.e., the command frequency) is stored in a collection of command statistics database 144. In another example, command statistics database 144 stores a plurality of collections that include frequency rates of commands for multiple geographical areas. In another embodiment, command statistics database 144 stores an expected usage frequency based on time and/or geographic area for a command, which prohibited list levels program 200 determines using historical command data of command statistics database 144. For example, command statistics database 144 stores a threshold value (e.g., an expected usage rate of a command), which prohibited list levels program 200 determines using historical collected data of and uses as a baseline in determining a deviation in a trend in command usage.

In various embodiments, command statistics database 144 includes information associated with devices and users that have authorized the collection of information (i.e., users that have opted-in). In once scenario, an owner of listening device 130 authorizes server 140 to store command usage and location information for all user profiles of listening device 130. In another scenario, an owner of listening device 130 authorizes server 140 to store command usage and location information for a subset of all user profiles of listening device 130.

Prohibited list levels program 200 modifies prohibited list file 146 based on changes in the frequency of use of a command within a geographical area. For example, prohibited list levels program 200 removes a command from prohibited list file 146 in response to a decrease in the number times the command is used in a geographical region. In another example, prohibited list levels program 200 modifies processing instructions of a command based on changes in the frequency of use of the command. In one embodiment, prohibited list levels program 200 tags a command with metadata and stores the command in command statistics database 144.

Figure 2:
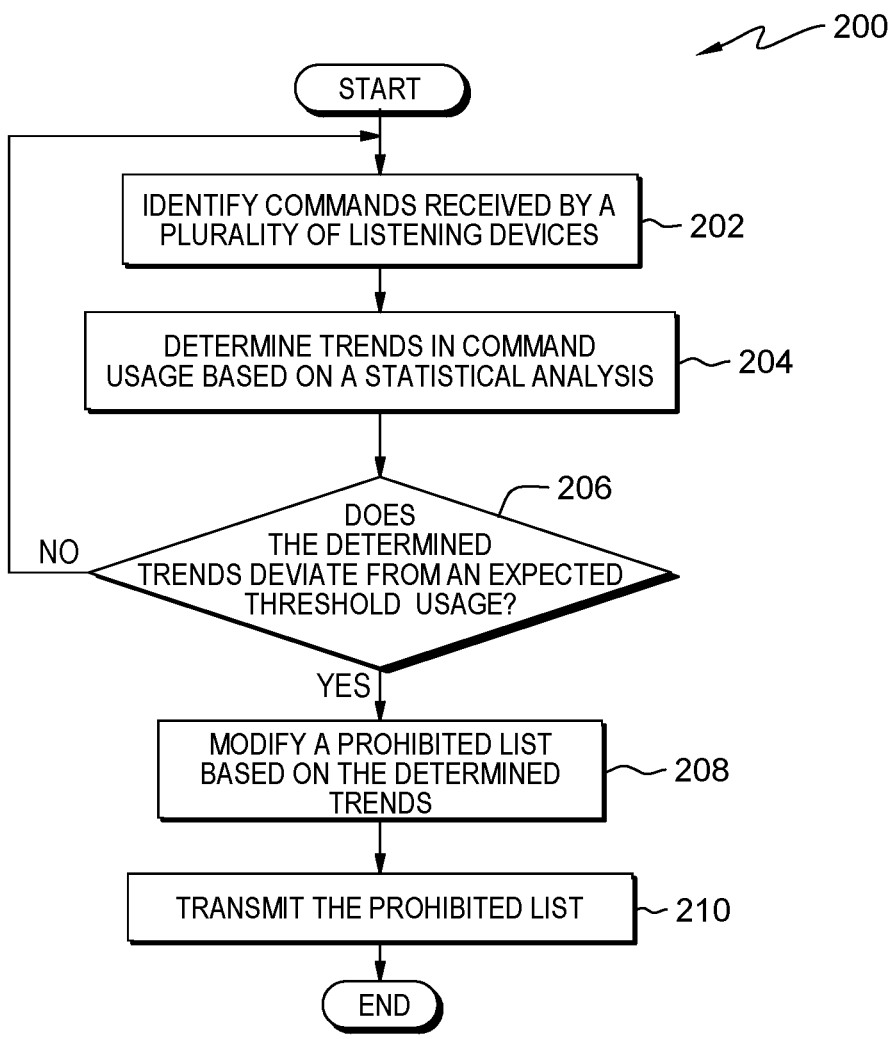
FIG. 2 is a flowchart depicting operational steps of a program for generating and/or modifying a prohibited list based on changes in a frequency of use of a command, in accordance with embodiments of the present invention.

FIG. 2 is a flowchart depicting operational steps of prohibited list levels program 200, a program for generating and/or modifying a prohibited list based on changes in a frequency of use of a command, in accordance with embodiments of the present invention. In one embodiment, prohibited list levels program 200 initiates in response to linking prohibited list levels program 200, client device 120, and listening device 130 over network 110. For example, a user creates an account on a server that links client device 120, listening device 130, and prohibited list levels program 200. In another embodiment, prohibited list levels program 200 is a background process running on server 140, which continuously operates while identifying commands being received by accessible listening devices. In an additional embodiment, prohibited list levels program 200 initiates and operates on a periodic basis (e.g., initiates at a defined time interval, initiates upon receiving a defined number of commands, etc.).

In step 202, prohibited list levels program 200 identifies commands received by a plurality of listening devices. In one embodiment, prohibited list levels program 200 utilizes NLP to identify a command of listening device 130. For example, prohibited list levels program 200 accesses a user profile of a smart speaker (e.g., listening device 130), utilizes NLP (e.g., parsing, natural language understanding, etc.) to derive text of the user profile, and identifies a "buy pizza" command. In various embodiments, prohibited list levels program 200 captures information associated with devices and users that have authorized the collection of information (i.e., users that have opted-in). In one scenario, an owner of listening device 130 authorizes prohibited list levels program 200 to store command usage and location information for all user profiles of listening device 130. In another scenario, an owner of listening device 130 authorizes prohibited list levels program 200 to store command usage and location information for a subset of all user profiles of listening device 130. In another embodiment, prohibited list levels program 200 accesses listening device 130 to retrieve a command listening device 130 has received. For example, prohibited list levels program 200 accesses a user profile of a smart speaker (e.g., listening device 130) and retrieves every command given to the smart speaker. In another example, prohibited list levels program 200 retrieves commands received within a defined time period (e.g., a day, a week, a month, etc.). In yet another example, prohibited list levels program 200 retrieves commands from a plurality of smart speakers within a geographical area.

In another embodiment, prohibited list levels program 200 accesses listening device 130 to determine a number of times that listening device 130 receives a command. For example, prohibited list levels program 200 accesses a user profile of a smart speaker (e.g., listening device 130) and determines the number of times the smart speaker received a command. In another example, prohibited list levels program 200 determines the number of times a smart speaker (e.g., listening device 130) receives a command within a defined time period. In another embodiment, prohibited list levels program 200 adds metadata to a retrieved command of listening device 130. For example, prohibited list levels program 200 utilizes the GPS and internal clock of a smart speaker (e.g., listening device 130) to derive a geolocation and a time, which corresponds to a command a smart speaker receives. In this example, prohibited list levels program 200 tags the command with the derived information (i.e., GPS location and time stamp).

In yet another embodiment, prohibited list levels program 200 stores a retrieved command and corresponding data in command statistics database 144 of storage device 142. For example, prohibited list levels program 200 stores a retrieved command and information corresponding to the retrieved command (e.g., metadata, GPS location, timestamp, etc.) in a database of a server. In another example embodiment, prohibited list levels program 200 aggregates command usage information (e.g., commands, geolocation metadata, timestamps, usage frequency, etc.) from plurality of listening devices (i.e., devices that have authorized data collection for prohibited list levels program 200) and stores the aggregated command usage information in command statistics database 144.

In step 204, prohibited list levels program 200 determines trends in command usage based on a statistical analysis. Prohibited list levels program 200 can determine a current trend in command usage to be a most recent collected period of data, such as within the last twenty-four hours. In various embodiments of the present invention, prohibited list levels program 200 utilizes the empirical rule, which may be used to define the percentage of values that lie within a normal distribution (e.g., a bell curve) of the mean. Prohibited list levels program 200 can utilize the empirical rule to define a threshold value for command usage that is considered expected and command usage that is considered a substantial change (i.e., a deviation from expected usage for a command).

In one embodiment, prohibited list levels program 200 generates a data set that includes historical usage information for each captured command, which includes time and/or geographic area information and stores the generated data set in command statistics database 144. In various embodiments, the data set for a command includes collected historical usage information for the command (e.g., usage counts for a command per defined period of time, corresponding timestamp and location metadata, number of times a command was rejected/cancelled, etc.) stored over a defined period of time (e.g., usage history for a command over one year). For example, prohibited list levels program 200 collects the number of times smart speakers in a city receive a "buy pizza" command over the course of a week. In this example, prohibited list levels program 200 stores the collected usage information for the command in a database (e.g., command statistics database 144). In various embodiments, prohibited list levels program 200 utilizes the data set for a command, which includes the historical usage for the command to derive the probability distribution (e.g., bell curve, etc.) of historical usage for the command.

In another embodiment, prohibited list levels program 200 collects a command usage of a command received by listening device 130 a defined number of times within a defined period of time and stores the collected data in command statistics database 144. For example, prohibited list levels program 200 collects a total number of times (e.g., an observation) that smart speakers in a city receive a "buy pizza" command. In this example, prohibited list levels program 200 collects the total number of the "buy pizza" command sixty (60) times (e.g., sample size) over the course of a week and stores the collected information in a respective data set for the "buy pizza" command.

In another embodiment, prohibited list levels program 200 utilizes data stored in command statistics database 144 (e.g., a data set corresponding to a command) to determine a standard deviation for each captured command and stores the standard deviation in command statistics database 144. For example, prohibited list levels program 200 utilizes collected data (e.g., a mean, the observations, number of samples, etc.) stored in a database to determine a standard deviation (e.g., to utilize as a threshold value) for the "buy pizza" command based on historical usage information for the command. In this example, prohibited list levels program 200 analyzes the collected historical information corresponding to the "buy pizza" command and determines that the 'buy pizza" command has a standard deviation of 20 (twenty) and the average command usage rate for a week, from the historical information, is seventy (70).

In another embodiment, the threshold value can be predefined, defined by a user preference, or dynamic. For example, a user defined preference is based on feedback (e.g., confirming commands, overriding commands, ignoring commands, etc.) of a user and the threshold value can vary accordingly. In another example, a dynamic threshold value is based on the occurrence of events that are sustained within a time frame and/or geographic area becoming a new mean, which effects respectively effects the threshold value. In various embodiments, prohibited list levels program 200 iterates (e.g., as a background process) the processes of steps 202 and 204 to maintain accurate and up-to-date data sets for commands received by listening devices. In additional embodiments, prohibited list levels program 200 can collect execution information for commands (i.e., whether an action corresponding to a command was executed or the action was cancelled) and store the execution information in the data set for the command. In such embodiments, prohibited list levels program 200 can generate a probability distribution based on the collected execution information of a command to determine a standard deviation of an execution rate of the command.

In decision step 206, prohibited list levels program 200 determines whether the determined trends deviate from an expected threshold usage. In various embodiments, prohibited list levels program 200 can utilize an indication of substantial statistical change (e.g., a standard deviation in usage) determines whether prohibited list levels program 200 modifies a prohibited list and a processing level of a command. In one embodiment, prohibited list levels program 200 determines whether data of command statistics database 144 indicates a substantial statistical change based on data collected from listening device 130.

For example, prohibited list levels program 200 can use the empirical rule (i.e., nearly all values are taken to be within three standard deviations of the mean of a normal distribution, and it is empirically useful to consider 99.7% probability as a near certainty) to determine whether a collected total (e.g., a value) for the "buy pizza" command is an acceptable amount of command usage (e.g., within the threshold). In this example, prohibited list levels program 200 utilizes the standard deviation of historical command usage as the threshold value for the "buy pizza" command. Accordingly, prohibited list levels program 200 determines whether a current usage trend (e.g., the collected total number of uses of a command within the last twenty-four hours) is less than or equal to or greater than or equal to one (1) standard deviation (e.g., the threshold value) away from the mean usage amount of the "buy pizza" commands stored in the command statistics database 144.

Figure 3:
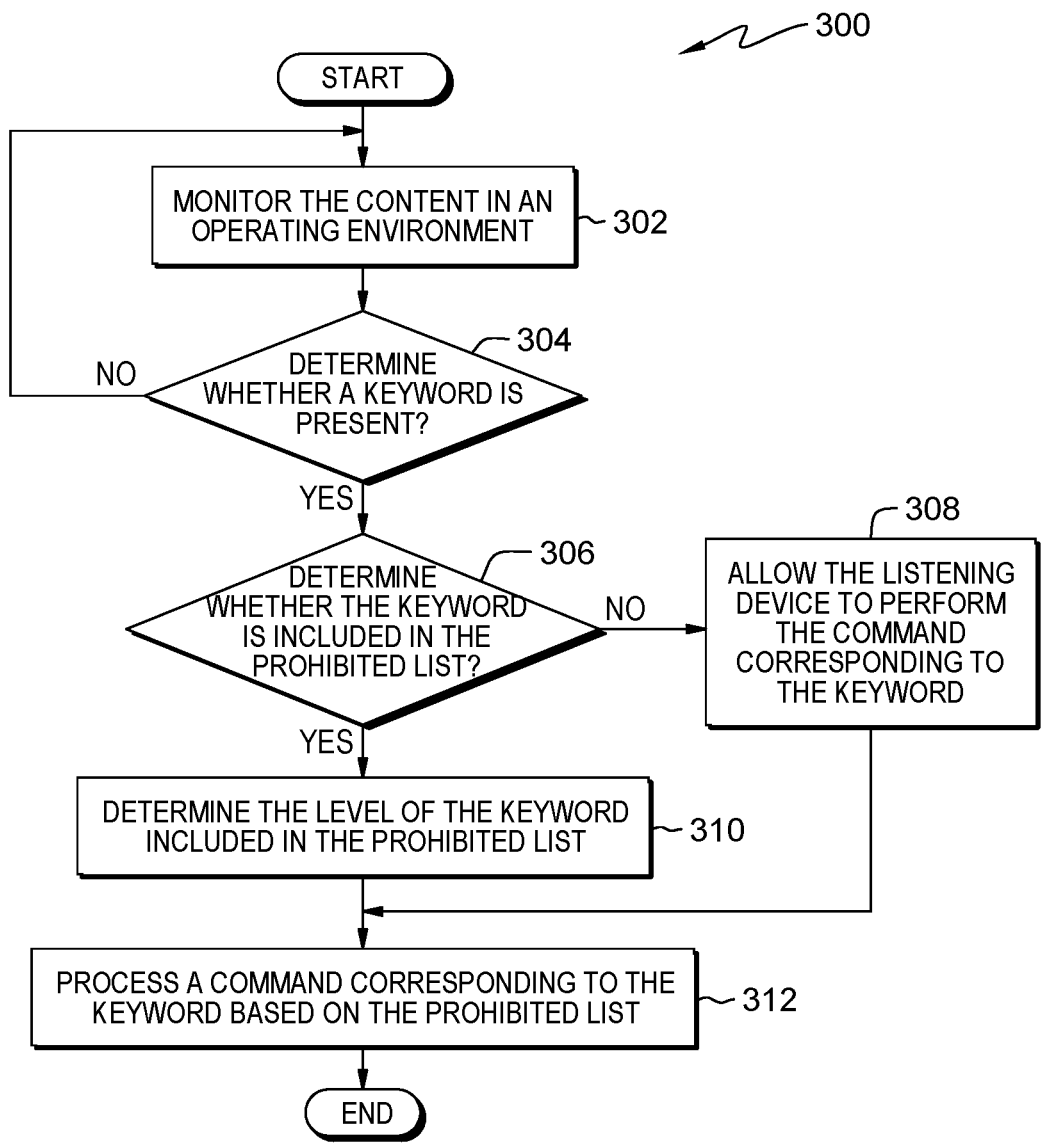
FIG. 3 is a flowchart depicting operational steps of prohibited list utilization program 300, monitoring an operating environment of a listening device in order to process commands, in accordance with embodiments of the present invention.

In another embodiment, if prohibited list levels program 200 determines that the determined trend does not deviate from the threshold value (decision step 206, "NO" branch), then prohibited list levels program 200 determines that the collected value is within an expected command usage (e.g., not a substantial statistical change), returns to step 202 to identify commands received by a plurality of listening devices, and processes commands according to prohibited list file 146, which is discussed in greater detail with regard to FIG. 3. For example, if prohibited list levels program 200 determines that the collected value of the "buy pizza" command is within or equal to one (1) standard deviation away from the average of the usage of the "buy pizza" command, then prohibited list levels program 200 determines that the collected value of the "buy pizza" command is not a substantial statistical change relative to historical usage and continues to monitor commands received by the smart speakers of a city. In this example, prohibited list levels program 200 would not modify a prohibited list file based on a determination of no substantial statistical change.

In yet another embodiment, if prohibited list levels program 200 determines that a current usage trend for a command is within or equal to the threshold value (e.g., less than or equal to the absolute value of the standard deviation) of the command usage, then prohibited list levels program 200 assigns the command a default processing level of one (1). In one scenario, if prohibited list levels program 200 determines that the collected value of the "buy pizza" command is within one (1) standard deviation of the average of the "buy pizza" command usage (e.g., the collected value of command usage is fifty-eight (58) within the past week relative to an average threshold of seventy (70) and a standard deviation of twenty (20)), then prohibited list levels program 200 assigns the "buy pizza" command a processing level of one (1). In this scenario, a command of processing level one (1) is not added to a prohibited list and is allowed to process without intervention.

In step 208, prohibited list levels program 200 modifies a prohibited list based on the determined trends. More specifically, responsive to prohibited list levels program 200 determining that the determined trend of command usage deviates from the expected usage threshold, (decision step 206, "YES" branch), prohibited list levels program 200 modifies prohibited list file 146. In various embodiments of the present invention, prohibited list levels program 200 modifies a prohibited list by adding or removing a command and/or assigning a processing level to the command. In example embodiments, processing level defines a level of authorization that is required to execute an action that corresponds to a command (e.g., prompt the user to accept/reject an action that corresponds to a command received by listening device 130).

In one embodiment, if prohibited list levels program 200 determines that a current usage trend for a command is outside of the threshold value (e.g., greater than the absolute value of the standard deviation) of the command usage, then prohibited list levels program 200 assigns a command a processing level of two (2) or three (3). In one scenario, if prohibited list levels program 200 determines that the collected value of the "buy pizza" command is greater than one (1) standard deviation but less than two (2) standard deviations from the average of the "buy pizza" command usage (e.g., the collected value of command usage is ninety-two (92) within the past week relative to an average threshold of seventy (70) and a standard deviation of twenty (20)), then prohibited list levels program 200 assigns the "buy pizza" command a processing level of two (2). In this scenario, prohibited list levels program 200 modifies prohibited list file 146 to include a processing level of two (2) for the command, which allows an action corresponding to the command to execute after confirmation from a user.

In another scenario, if prohibited list levels program 200 determines that the collected value of the "buy pizza" command is greater than two (2) standard deviations from the average of the "buy pizza" command usage (e.g., the collected value of command usage is one-hundred twenty (120) within the past week relative to an average threshold of seventy (70) and a standard deviation of twenty (20)), then prohibited list levels program 200 assigns the "buy pizza" command a processing level of three (3). In this scenario, prohibited list levels program 200 modifies prohibited list file 146 to include a processing level of three (3) for the command, which ignores when a smart speaker receives the command.

In another embodiment, if prohibited list levels program 200 determines a current usage trend for a command makes a substantial statistical increase or decrease relative to historical trends, then prohibited list levels program 200 respectively assigns the command a processing level. In one scenario, if prohibited list levels program 200 determines that a command usage of a command of processing level one (1) has had a substantial statistical increase (e.g., exceeding a threshold value or standard deviation), then prohibited list levels program 200 assigns the command a processing level of two (2) (i.e., increases the processing level). In another scenario, if prohibited list levels program 200 determines that a command usage of a command of processing level two (2) has had a substantial statistical increase (e.g., exceeding a threshold value, such as two standard deviations), then prohibited list levels program 200 assigns the command a processing level of three (3).

In an additional scenario, if prohibited list levels program 200 determines that a command usage of a command of processing level three (3) has had a substantial statistical decrease (e.g., a decreasing usage trend that falls under a defined threshold), then prohibited list levels program 200 assigns the command a processing level of two (2) (i.e., decreases the processing level). In yet another scenario, if prohibited list levels program 200 determines that a command usage of a command of processing level two (2) has had a substantial statistical decrease (e.g., a decreasing usage trend that falls under a defined threshold), then prohibited list levels program 200 assigns the command a processing level of one (1).

In various embodiments, prohibited list levels program 200 creates a dynamic prohibited list file (e.g., prohibited list file 146), which provides a number of improvements relative to a static prohibited list file. For example, adding and removing commands based on current trends in command usage creates an accurate list of commands for a computing device (e.g., listening device 130), which can be tailored to a geographic area and/or timeframe in near real-time and/or real-time. In another example, removing a command with low usage frequency reduces the amount storage and processing resources a computing device utilizes by reducing the size of a prohibited list file making it less burdensome on the computing device when utilized. In another example, reducing the amount of commands that are improperly processed conserves a sizeable amount of power of a computing device, particularly when commands have a high frequency of usage.

In step 210, prohibited list levels program 200 transmits the prohibited list. In one embodiment, prohibited list levels program 200 transmits prohibited list file 146 to listening device 130 through network 110. For example, prohibited list levels program 200 sends a prohibited list (e.g., prohibited list file 146) to a smart speaker (e.g., listening device 130) via the Internet. In another example, prohibited list levels program 200 sends a prohibited list (e.g., prohibited list file 146) to a plurality of smart speakers (e.g., within a state, municipality, a defined geographic area, etc.), which have authorized communication with prohibited list levels program 200, via the Internet. In this example, the transmitted prohibited list is tailored based on the command usage trends of a city of the plurality of smart speakers. In yet another example, prohibited list levels program 200 sends a prohibited list (e.g., prohibited list file 146) to a smart speaker (e.g., listening device 130) in response to a user linking an account associated with prohibited list levels program 200 and the smart speaker.

Accordingly, embodiments of the present invention reduce the amount of unwanted commands processed by a listening device. The generated modified prohibited list helps prevent the processing of unwanted commands based on the use of a word in a region and/or during a timeframe.

FIG. 3 is a flowchart depicting operational steps of prohibited list utilization program 300, monitoring an operating environment of a listening device in order to process commands, in accordance with embodiments of the present invention. In an example embodiment, prohibited list utilization program 300 initiates in response to prohibited list levels program 200 sending a prohibited list file to listening device 130 (e.g., an instance of prohibited list file 146 that was modified by prohibited list levels program 200). In another example embodiment, prohibited list utilization program 300 initiates in response to prohibited list levels program 200 modifying a prohibited list file a smart speaker uses.

In step 302, prohibited list utilization program 300 monitors the content in an operating environment. In one embodiment, prohibited list utilization program 300 monitors an operating environment of listening device 130 for content. For example, prohibited list utilization program 300 utilizes the microphone of a smart speaker to detect audio of content in an operating environment (i.e., the area surrounding the smart speaker) of the smart speaker.

In decision step 304, prohibited list utilization program 300 determines whether a keyword is present. In various embodiments of the present invention, prohibited list utilization program 300 utilizes NLP to determine whether a keyword is present in the operating environment of a listening device. In one embodiment, prohibited list utilization program 300 uses a microphone of listening device 130 to receive audio from the operating environment of listening device 130 and utilizes NLP to determine whether a keyword in the audio corresponds to any commands included in a file of listening device 130. For example, prohibited list utilization program 300 uses a microphone of a smart speaker to monitor audio in the operating environment of a smart speaker, utilizes NLP (e.g., speech recognition) to derive a textual representation of the audio detected, and determines whether the textual representation of the audio includes a keyword that is included in the profile of a user of the smart speaker.

If prohibited list utilization program 300 determines that a keyword is not present in the operating environment (decision step 304, "NO" branch), then prohibited list utilization program 300 returns to step 302 to continue to monitor the content in the operating environment of listening device 130. For example, if prohibited list utilization program 300 detects no keywords in the operating environment of the smart speaker (e.g., listening device 130) based on analyzing the incoming audio (i.e., monitored content) in the operating environment of the smart speaker, then prohibited list utilization program 300 continues to monitor the audio of the operating environment of the smart speaker.

In decision step 306, prohibited list utilization program 300 determines whether the keyword is included in the prohibited list. More specifically, in response to prohibited list utilization program 300 determining a keyword is present in the operating environment of listening device 130, prohibited list utilization program 300 utilizes NLP to scan the text of the prohibited list file (e.g., the transmitted prohibited list file from step 210 of prohibited list levels program 200) included in listening device 130 for a matching textual representation of the keyword present in the operating environment of listening device 130. For example, prohibited list utilization program 300 detects the phrase "Open pizza application and buy my favorite pizza." using the microphone of a smart speaker. In this example, prohibited list utilization program 300 uses NLP to derive text from the audio including the phrase, and scans text of the prohibited list file (e.g., prohibited list file 146) of the smart speaker for a matching prohibited listed keyword.

If prohibited list utilization program 300 determines that the keyword is not included in the prohibited list file (decision step 306, "NO" branch), then prohibited list utilization program 300 allows listening device 130 to perform the command corresponding to the keyword. For example, if prohibited list utilization program 300 scans the text of the prohibited list file for the phrase "Open pizza application and buy my favorite pizza." (e.g., the keyword) and does not identify text that matches a phrase in the prohibited list file, then prohibited list utilization program 300 allows the smart speaker to perform the command corresponding to the keyword (i.e., buying pizza).

In step 308, prohibited list utilization program 300 allows the listening device to perform the command corresponding to the keyword. In one embodiment, in response to prohibited list utilization program 300 determining that the keyword present in the operating environment of listening device 130 is not present on prohibited list file 146, prohibited list utilization program 300 allows listening device 130 to perform the command corresponding with the keyword. For example, prohibited list utilization program 300 detects the phrase "Open pizza application and buy my favorite pizza." using a microphone of a smart speaker and allows the smart speaker to open the pizza application and purchase a pizza.

In step 310, prohibited list utilization program 300 determines the level of the keyword included in the prohibited list. More specifically, in response to determining that the keyword detected in the operating environment of listening device 130 (decision step 304, "YES" branch) is included in prohibited list file 146 (decision step 306, "YES" branch), prohibited list utilization program 300 determines the processing level of the keyword (detected in decision step 304). In one embodiment, prohibited list utilization program 300 accesses prohibited list file 146 to determine the assigned processing level of a command.

In one example, prohibited list utilization program 300 accesses the prohibited list file and does not identify the "buy pizza" command, then prohibited list utilization program 300 determines that the "buy pizza" command is assigned to level one (1) (i.e., the keyword is not in the prohibited list and is allowed to process without intervention). In another example, if prohibited list utilization program 300 accesses the prohibited list file and identifies that the "buy pizza" command is assigned to level two (2), then prohibited list utilization program 300 determines that the "buy pizza" command is in confirmation mode (i.e., requires user authorization to execute the action that corresponds to the detected command). In yet another example, if prohibited list utilization program 300 accesses the prohibited list file and identifies that the "buy pizza" command is assigned to level three (3), then prohibited list utilization program 300 determines that the "buy pizza" command is in full block mode (i.e., prevents execution of the action that corresponds to the detected command).

In step 312, prohibited list utilization program 300 processes a command corresponding to the keyword based on the prohibited list. In one embodiment, prohibited list utilization program 300 processes a detected command of processing level one (1) (i.e., normal operation) on listening device 130. For example, prohibited list utilization program 300 detects the phrase "Open pizza application and buy my favorite pizza." using a microphone of a smart speaker and allows the smart speaker to open the pizza application and purchase a pizza.

In another embodiment, prohibited list utilization program 300 generates and transmits a confirmation to client device 120 in response to detecting a command of processing level two (2) (i.e., confirmation mode), which determines whether listening device 130 performs a task corresponding to the command. For example, prohibited list utilization program 300 sends a confirmation message to a tablet (e.g., via user interface 122 and/or application 124 of client device 120) of a user, which requests the user to confirm whether the user would like to ignore or approve of the "buy pizza" command. In this example, if the user elects to approve the "buy pizza" command, then prohibited list utilization program 300 allows the smart speaker to order the pizza (i.e., executes the action corresponding to the detected command). Additionally, if the user elects to ignore the "buy pizza" command, then prohibited list utilization program 300 prohibits the smart speaker from ordering the pizza (i.e., prevents execution of the action corresponding to the detected command). In another example, the generated confirmation can be a biometric confirmation (e.g., random words, facial recognition, etc.), which can be utilized to eliminate a false confirmation of the unwanted command.

In yet another embodiment, prohibited list utilization program 300 prohibits listening device 130 from performing a detected command with an associated processing level three (3) (i.e., full block mode). For example, if prohibited list utilization program 300 detects the "buy pizza" command and determines the "buy pizza" command is included in the prohibited list (e.g., prohibited list file 146), then the smart speaker ignores the request to order a pizza (i.e., the smart speaker does not execute the task corresponding to the detected command on associated devices).

Figure 4:
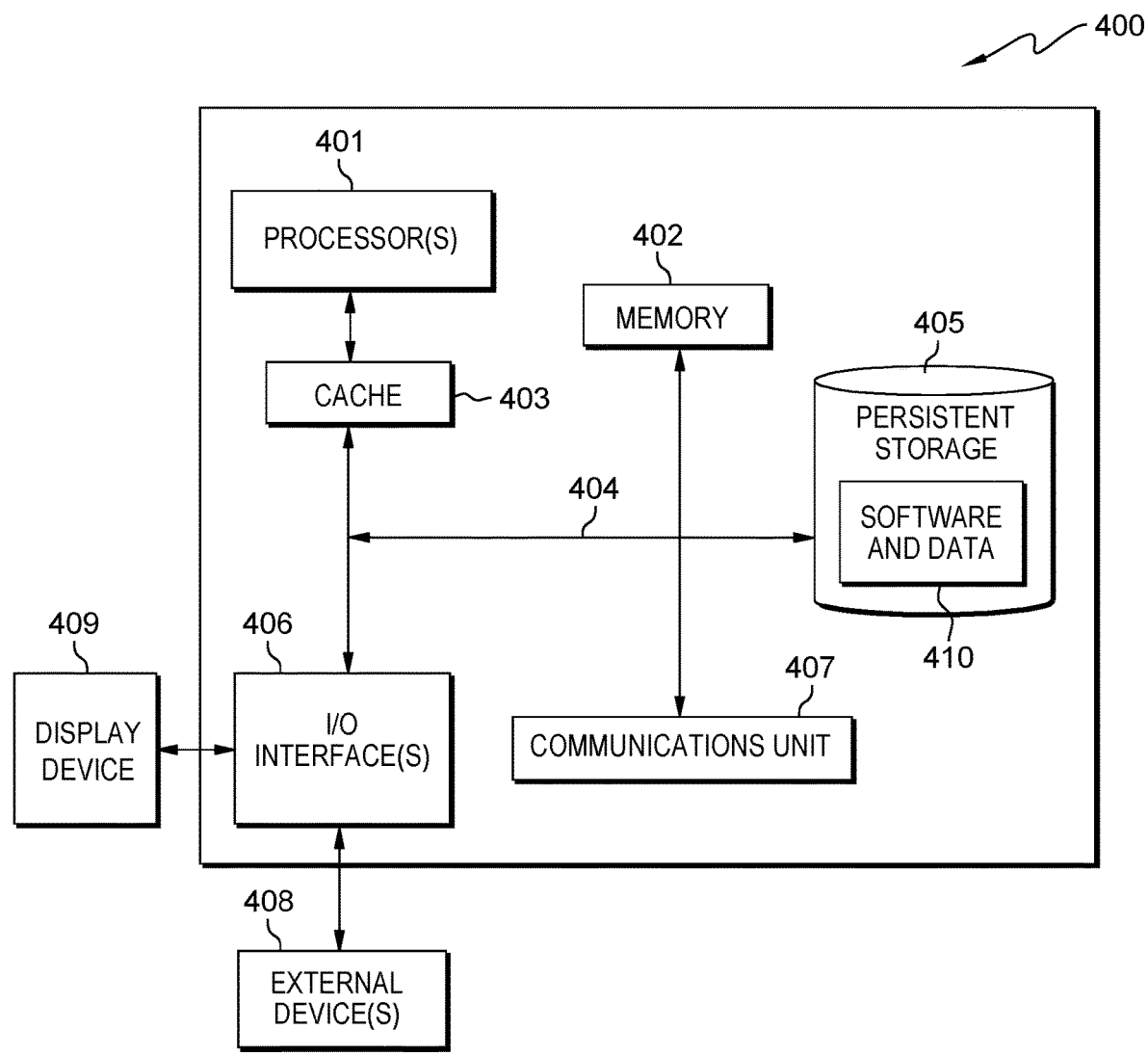
FIG. 4 depicts a block diagram of components of a computing system representative of the server of FIG. 1, in accordance with an embodiment of the present invention.

FIG. 4 depicts computer system 400, which is representative of client device 120, listening device 130, and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to listening device 130, software and data 410 includes prohibited list utilization program 300. With respect to server 140, software and data 410 includes prohibited list levels program 200, command statistics database, and prohibited list file 146. With respect to client device 120, software and data 410 includes application 124.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    determining, by one or more processors, a trend in usage of a command based on an analysis of aggregated usage information of the command from a plurality of listening devices, wherein the determined trend indicates an amount of usage of the command over a period of time, wherein determining the trend in usage of the command, further comprises:
        adding, by one or more processors, metadata corresponding to a respective instance of the command from the plurality of listening devices;
    determining, by one or more processors, whether the determined trend in usage of the command deviates from a usage threshold for the command;
    in response to determining that the determined trend in usage of the command does deviate from the usage threshold for the command, modifying, by one or more processors, a prohibited list of commands based on an amount of deviation from the usage threshold of the command, wherein the prohibited list prevents execution of false commands by the plurality of listening devices;
    determining, by one or more processors, a processing level corresponding to the command based at least in part on the modified prohibited list and the amount of deviation from the usage threshold, wherein the processing level corresponds to a user confirmation task prior to execution of an action that corresponds to the command; and
    transmitting, by one or more processors, the modified prohibited list to a listening device of the plurality of listening devices.

2. The method of claim 1, further comprising:
    transmitting, by one or more processors, the modified prohibited list to a group of listening devices that are located within a defined geographic location that corresponds to the determined trend in usage of the command.

3. The method of claim 1, wherein determining a trend in usage of a command based on an analysis of aggregated usage information of the command from a plurality of listening devices further comprises:
    aggregating, by one or more processors, usage information and corresponding metadata for commands received by the plurality of listening devices; and
    generating, by one or more processors, a data set for the command that includes the aggregated usage information for the command and the aggregated corresponding metadata for the command.

4. The method of claim 3, wherein the aggregated metadata corresponding to the command includes information selected from the group consisting of: timestamps of respective uses of the command, geolocations of respective uses of the command, and indications of whether actions corresponding to the command were accepted.

5. The method of claim 1, wherein modifying the prohibited list based on the amount of deviation from the usage threshold usage of the command further comprises:
    in response to determining that the determined trend in usage of the command deviates from the usage threshold for the command by an amount that uses that exceeds a first threshold, modifying, by one or more processors, the prohibited list by adding a confirmation step to actions that correspond to the command, wherein the confirmation step includes sending a request to a user to confirm approval of performing the actions that correspond to the command.

6. The method of claim 1, wherein modifying the prohibited list based on the amount of deviation from the usage threshold usage of the command further comprises:
    in response to determining that the determined trend in usage of the command deviates from the usage threshold for the command by an amount that uses that exceeds a second threshold, modifying, by one or more processors, the prohibited list by adding an instruction to ignore the command and not perform actions that correspond to the command.

7. A computer program product comprising:
    one or more computer readable storage medium and program instructions stored on the one or more computer readable storage medium, the program instructions comprising:
    program instructions to determine a trend in usage of a command based on an analysis of aggregated usage information of the command from a plurality of listening devices, wherein the determined trend indicates an amount of usage of the command over a period of time, wherein determining the trend in usage of the command, further comprises:
        program instructions to add metadata corresponding to a respective instance of the command from the plurality of listening devices;
    program instructions to determine whether the determined trend in usage of the command deviates from a usage threshold for the command;
    in response to determining that the determined trend in usage of the command does deviate from the usage threshold for the command, program instructions to modify a prohibited list of commands based on an amount of deviation from the usage threshold of the command, wherein the prohibited list prevents execution of false commands by the plurality of listening devices;
    program instructions to determine a processing level corresponding to the command based at least in part on the modified prohibited list and the amount of deviation from the usage threshold, wherein the processing level corresponds to a user confirmation task prior to execution of an action that corresponds to the command; and
    transmit the modified prohibited list to a listening device of the plurality of listening devices.

8. The computer program product of claim 7, further comprising program instructions, stored on the one or more computer readable storage medium, to:

transmit the modified prohibited list to a group of listening devices that are located within a defined geographic location that corresponds to the determined trend in usage of the command.

9. The computer program product of claim 7, wherein the program instructions to determine a trend in usage of a command based on an analysis of aggregated usage information of the command from a plurality of listening devices, further comprise program instructions to:
aggregate usage information and corresponding metadata for commands received by the plurality of listening devices; and
generate a data set for the command that includes the aggregated usage information for the command and the aggregated corresponding metadata for the command.

10. The computer program product of claim 9, wherein the aggregated metadata corresponding to the command includes information selected from the group consisting of: timestamps of respective uses of the command, geolocations of respective uses of the command, and indications of whether actions corresponding to the command were accepted.

11. The computer program product of claim 7, wherein the program instructions to modify the prohibited list based on the amount of deviation from the usage threshold usage of the command, further comprise program instructions to:
in response to determining that the determined trend in usage of the command deviates from the usage threshold for the command by an amount that uses that exceeds a first threshold, modify the prohibited list by adding a confirmation step to actions that correspond to the command, wherein the confirmation step includes sending a request to a user to confirm approval of performing the actions that correspond to the command.

12. The computer program product of claim 7, wherein the program instructions to modify the prohibited list based on the amount of deviation from the usage threshold usage of the command, further comprise program instructions to:
in response to determining that the determined trend in usage of the command deviates from the usage threshold for the command by an amount that uses that exceeds a second threshold, modify the prohibited list by adding an instruction to ignore the command and not perform actions that correspond to the command.

13. A computer system comprising:
one or more computer processors;
one or more computer readable storage medium; and
program instructions stored on the computer readable storage medium for execution by at least one of the one or more hardware processors, the program instructions comprising:
program instructions to determine a trend in usage of a command based on an analysis of aggregated usage information of the command from a plurality of listening devices, wherein the determined trend indicates an amount of usage of the command over a period of time, wherein determining the trend in usage of the command, further comprises:
program instructions to add metadata corresponding to a respective instance of the command from the plurality of listening devices;
program instructions to determine whether the determined trend in usage of the command deviates from a usage threshold for the command;
in response to determining that the determined trend in usage of the command does deviate from the usage threshold for the command, program instructions to modify a prohibited list of commands based on an amount of deviation from the usage threshold of the command, wherein the prohibited list prevents execution of false commands by the plurality of listening devices;
program instructions to determine a processing level corresponding to the command based at least in part on the modified prohibited list and the amount of deviation from the usage threshold, wherein the processing level corresponds to a user confirmation task prior to execution of an action that corresponds to the command; and
transmit the modified prohibited list to a listening device of the plurality of listening devices.

14. The computer system of claim 13, further comprising program instructions, stored on the one or more computer readable storage medium, to:
transmit the modified prohibited list to a group of listening devices that are located within a defined geographic location that corresponds to the determined trend in usage of the command.

15. The computer system of claim 13, wherein the program instructions to determine a trend in usage of a command based on an analysis of aggregated usage information of the command from a plurality of listening devices, further comprise program instructions to:
aggregate usage information and corresponding metadata for commands received by the plurality of listening devices; and
generate a data set for the command that includes the aggregated usage information for the command and the aggregated corresponding metadata for the command.

16. The computer system of claim 15, wherein the aggregated metadata corresponding to the command includes information selected from the group consisting of: timestamps of respective uses of the command, geolocations of respective uses of the command, and indications of whether actions corresponding to the command were accepted.

17. The computer system of claim 13, wherein the program instructions to modify the prohibited list based on the amount of deviation from the usage threshold usage of the command, further comprise program instructions to:
in response to determining that the determined trend in usage of the command deviates from the usage threshold for the command by an amount that uses that exceeds a first threshold, modify the prohibited list by adding a confirmation step to actions that correspond to the command, wherein the confirmation step includes sending a request to a user to confirm approval of performing the actions that correspond to the command.

* * * * *